(12) United States Patent
Duale et al.

(10) Patent No.: US 11,001,273 B2
(45) Date of Patent: May 11, 2021

(54) PROVIDING A NOTIFICATION BASED ON A DEVIATION FROM A DETERMINED DRIVING BEHAVIOR

(71) Applicant: INTERNATIONAL BUSINESS MACHINES CORPORATION, Armonk, NY (US)

(72) Inventors: Ali Y. Duale, Poughkeepsie, NY (US); John S. Werner, Fishkill, NY (US); Arkadiy O. Tsfasman, Wappingers Falls, NY (US); Shailesh R. Gami, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 284 days.

(21) Appl. No.: 15/986,172

(22) Filed: May 22, 2018

(65) Prior Publication Data
US 2019/0359223 A1 Nov. 28, 2019

(51) Int. Cl.
| | | |
|---|---|---|
| *B60W 50/04* | (2006.01) | |
| *B60W 50/12* | (2012.01) | |
| *B60W 40/09* | (2012.01) | |
| *B60Q 9/00* | (2006.01) | |
| *B60W 50/00* | (2006.01) | |
| *B60W 50/14* | (2020.01) | |

(52) U.S. Cl.
CPC .............. *B60W 50/12* (2013.01); *B60Q 9/00* (2013.01); *B60W 40/09* (2013.01); *B60W 50/0098* (2013.01); *B60W 50/14* (2013.01); *B60W 2400/00* (2013.01); *B60W 2420/42* (2013.01); *B60W 2420/60* (2013.01); *B60W 2540/30* (2013.01); *B60W 2554/801* (2020.02); *B60W 2554/804* (2020.02); *B60W 2555/20* (2020.02); *B60W 2556/45* (2020.02)

(58) Field of Classification Search
USPC .......................................... 701/1, 23–28, 36
See application file for complete search history.

(56) References Cited

U.S. PATENT DOCUMENTS

| | | | |
|---|---|---|---|
| 5,612,882 A | * | 3/1997 | LeFebvre ........... G01C 21/3453 340/990 |
| 5,798,695 A | | 8/1998 | Metalis et al. |
| | | | (Continued) |

OTHER PUBLICATIONS

A. El Masri, "Toward self-policing: Detecting drunk driving behaviors through sampling CAN bus data," 2017 International Conference on Electrical and Computing Technologies and Applications (ICECTA), Ras Al Khaimah, United Arab Emirates, 2017, pp. 1-5.

(Continued)

*Primary Examiner* — Jonathan L Sample
(74) *Attorney, Agent, or Firm* — Cantor Colburn LLP; Teddi Maranzano

(57) ABSTRACT

Embodiments of the invention are directed to a computer-implemented method that includes determining, by a vehicle controller associated with a vehicle, a typical driving behavior of a driver of the vehicle. The method also includes detecting, by the vehicle controller associated with the vehicle, that the driver has deviated from the typical driving behavior. The method also includes transmitting a notification that indicates that the driver has deviated from the typical driving behavior.

17 Claims, 7 Drawing Sheets

(56) References Cited

U.S. PATENT DOCUMENTS

| | | | | |
|---|---|---|---|---|
| 6,223,117 B1* | 4/2001 | Labuhn | | B60W 30/16 |
| | | | | 701/93 |
| 6,438,472 B1* | 8/2002 | Tano | | G07C 5/0858 |
| | | | | 701/29.6 |
| 6,449,572 B1* | 9/2002 | Kurz | | B60T 8/172 |
| | | | | 702/94 |
| 6,675,081 B2 | 1/2004 | Shuman | | B60K 28/06 |
| | | | | 340/436 |
| 6,711,493 B1* | 3/2004 | Andrews | | G08G 1/0104 |
| | | | | 340/903 |
| 6,873,911 B2* | 3/2005 | Nishira | | G08G 1/166 |
| | | | | 701/301 |
| 6,925,425 B2* | 8/2005 | Remboski | | G07C 5/0808 |
| | | | | 340/540 |
| 7,292,152 B2* | 11/2007 | Torkkola | | G08B 21/06 |
| | | | | 340/576 |
| 7,382,274 B1* | 6/2008 | Kermani | | B60K 31/0058 |
| | | | | 340/901 |
| 7,444,311 B2* | 10/2008 | Engstrom | | G05B 13/027 |
| | | | | 706/20 |
| 7,463,157 B2* | 12/2008 | Victor | | A61B 5/18 |
| | | | | 340/576 |
| 7,765,058 B2* | 7/2010 | Doering | | B60R 16/0236 |
| | | | | 701/123 |
| 7,809,487 B2* | 10/2010 | Syed | | B60T 8/175 |
| | | | | 701/70 |
| 8,786,421 B2* | 7/2014 | Dozza | | B60Q 5/006 |
| | | | | 340/468 |
| 8,903,593 B1* | 12/2014 | Addepalli | | G06F 9/542 |
| | | | | 701/29.1 |
| 9,995,584 B1* | 6/2018 | Kanevsky | | B60W 40/09 |
| 2002/0091473 A1* | 7/2002 | Gardner | | G07C 5/0816 |
| | | | | 701/32.7 |
| 2002/0151297 A1* | 10/2002 | Remboski | | G07C 5/085 |
| | | | | 455/414.1 |
| 2003/0065432 A1* | 4/2003 | Shuman | | G08G 1/096844 |
| | | | | 701/48 |
| 2004/0243301 A1* | 12/2004 | Kim | | G08G 1/0969 |
| | | | | 701/533 |
| 2004/0252027 A1* | 12/2004 | Torkkola | | G08B 21/06 |
| | | | | 340/576 |
| 2005/0131597 A1* | 6/2005 | Raz | | G09B 19/167 |
| | | | | 701/29.1 |
| 2005/0159851 A1* | 7/2005 | Engstrom | | B60W 30/18181 |
| | | | | 701/1 |
| 2005/0228578 A1* | 10/2005 | Burzio | | G08G 1/096775 |
| | | | | 701/117 |
| 2005/0256635 A1* | 11/2005 | Gardner | | G01C 21/3641 |
| | | | | 701/431 |
| 2006/0195231 A1* | 8/2006 | Diebold | | B60T 7/22 |
| | | | | 701/1 |
| 2007/0027583 A1* | 2/2007 | Tamir | | G08G 1/164 |
| | | | | 701/1 |
| 2007/0112500 A1* | 5/2007 | Ogawa | | B60W 40/09 |
| | | | | 701/96 |
| 2008/0243558 A1 | 10/2008 | Gupte | | |
| 2008/0275618 A1* | 11/2008 | Grimm | | G08G 1/162 |
| | | | | 701/96 |
| 2009/0271101 A1* | 10/2009 | Relyea | | H04W 4/50 |
| | | | | 701/118 |
| 2010/0209889 A1* | 8/2010 | Huang | | G09B 19/167 |
| | | | | 434/65 |
| 2010/0211270 A1* | 8/2010 | Chin | | B62D 6/007 |
| | | | | 701/44 |
| 2011/0210867 A1* | 9/2011 | Benedikt | | G08G 1/096725 |
| | | | | 340/905 |
| 2011/0307188 A1 | 12/2011 | Peng et al. | | |
| 2013/0073112 A1* | 3/2013 | Phelan | | G08G 1/20 |
| | | | | 701/1 |
| 2014/0278569 A1* | 9/2014 | Sanchez | | G06Q 40/08 |
| | | | | 705/4 |
| 2014/0278574 A1* | 9/2014 | Barber | | B60W 40/09 |
| | | | | 705/4 |
| 2014/0309806 A1* | 10/2014 | Ricci | | B60R 25/1004 |
| | | | | 701/1 |
| 2014/0309870 A1* | 10/2014 | Ricci | | B60C 1/00 |
| | | | | 701/36 |
| 2015/0262435 A1* | 9/2015 | Delong | | G07C 5/085 |
| | | | | 340/439 |
| 2015/0266455 A1* | 9/2015 | Wilson | | B60W 30/10 |
| | | | | 701/93 |
| 2015/0375756 A1* | 12/2015 | Do | | B60W 30/0956 |
| | | | | 701/1 |
| 2016/0046298 A1* | 2/2016 | DeRuyck | | B60W 50/14 |
| | | | | 340/576 |
| 2016/0084661 A1* | 3/2016 | Gautama | | G01C 21/365 |
| | | | | 701/400 |
| 2016/0176412 A1* | 6/2016 | Gunaratne | | B60W 30/02 |
| | | | | 701/23 |
| 2016/0375908 A1* | 12/2016 | Biemer | | G07C 5/08 |
| | | | | 701/1 |
| 2017/0166217 A1* | 6/2017 | Sbianchi | | G06F 11/3089 |
| 2017/0210290 A1* | 7/2017 | Cordova | | B60Q 9/00 |
| 2017/0234689 A1* | 8/2017 | Gibson | | G05D 1/0061 |
| | | | | 701/25 |
| 2017/0305434 A1* | 10/2017 | Ratnasingam | | B60W 40/09 |
| 2017/0369073 A1* | 12/2017 | Huber | | B60W 30/08 |
| 2018/0178766 A1* | 6/2018 | Oba | | G05D 1/0276 |
| 2018/0194280 A1* | 7/2018 | Shibata | | G01C 21/3658 |
| 2018/0265095 A1* | 9/2018 | Joe | | B60W 40/06 |
| 2019/0100216 A1* | 4/2019 | Volos | | G01S 19/42 |

OTHER PUBLICATIONS

A. Fuentes, "Videosensor for the Detection of Unsafe Driving Behavior in the Proximity of Black Spots." Sensors (Basel, Switzerland) 14.11 (2014): 19926-19944.

Anonymous, "A Method and System for Signaling Mild Cognitive Impairment of a Vehicle Operator." IP.com Disclosure No. IPCOM000239476D, Publication Date: Nov. 11, 2014, pp. 1-3.

ITURAN, "ITURAN Safety System" [online]; [retrieved Jan. 21, 2018]; retrieved from the Internet http://www.ituraneurope.eu/en/wp-content/uploads/2017/05/28_Safety-English-Product-Page21.9.16_High.pdf.

J. Dai, "Mobile phone based drunk driving detection," 2010 4th International Conference on Pervasive Computing Technologies for Healthcare, Munich, 2010, pp. 1-8.

J. Hu, "Abnormal Driving Detection Based on Normalized Driving Behavior," in IEEE Transactions on Vehicular Technology, vol. 66, No. 8, pp. 6645-6652, Aug. 2017.

J. Yang, "Driver State Estimation Based on Dynamic Bayesian Networks Considering Different Age and Gender Groups." In Proceedings of the 9th International Conference on Automotive User Interfaces and Interactive Vehicular Applications Adjunct (AutomotiveUI '17). ACM, New York, NY, USA, 131-135, 2017.

W. Wang et al., "Modeling and Recognizing Driver Behavior Based on Driving Data: A Survey", Mathematical Problems in Engineering, vol. 2014, Article ID 245641, 20 pages, 2014.

\* cited by examiner

PROVIDING A NOTIFICATION BASED ON A DEVIATION FROM A DETERMINED DRIVING BEHAVIOR

BACKGROUND

The present invention relates in general to providing a notification based on a deviation from a determined driving behavior. More specifically, the present invention relates to computer systems configured to determine a typical driving behavior of a driver, and to determine whether the driver has deviated from the typical driving pattern.

Driver monitoring systems are generally implemented within vehicles in order to improve vehicle safety. A driver monitoring system can use different sensors and cameras to monitor different aspects of the driver. For example, the driver monitoring system can use cameras/sensors to track the eye movement of the driver. The driver monitoring system can also monitor a steering action of the driver and/or a speed of the driver by operating in conjunction with a steering sensor and/or a speed sensor, for example.

SUMMARY

A computer-implemented method according to one or more embodiments of the invention includes determining, by a vehicle controller associated with a vehicle, a typical driving behavior of a driver of the vehicle. The method also includes detecting, by the vehicle controller associated with the vehicle, that the driver has deviated from the typical driving behavior. The method also includes transmitting a notification that indicates that the driver has deviated from the typical driving behavior.

A computer system according to one or more embodiments of the invention includes a memory and a processor system of a vehicle. The processor system is configured to perform a method including determining a typical driving behavior of a driver of the vehicle. The method can also include detecting that the driver has deviated from the typical driving behavior. The method can also include transmitting a notification that indicates that the driver has deviated from the typical driving behavior.

A computer program product according to one or more embodiments of the invention includes a computer-readable storage medium having program instructions embodied therewith. The program instructions are readable by a processor system of a vehicle to cause the processor system to determine a typical driving behavior of a driver of the vehicle. The processor system can also be caused to detect that the driver has deviated from the typical driving behavior. The processor system can also be caused to transmit a notification that indicates that the driver has deviated from the typical driving behavior.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
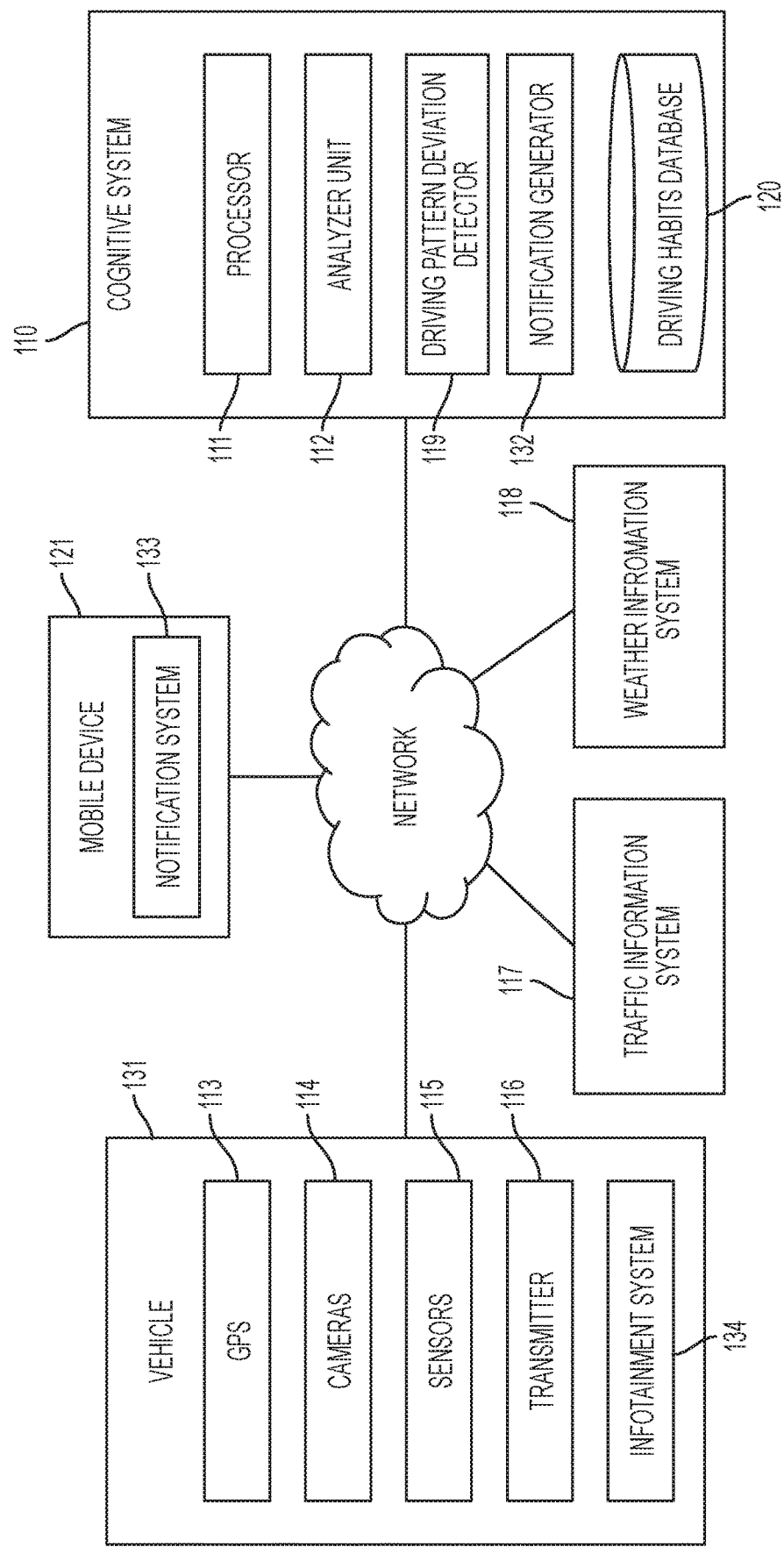
FIG. 1 illustrates a cognitive system that provides a notification based on a determined deviation from a determined driving behavior in accordance with one or more embodiments of the invention.

Various embodiments of the invention are described herein with reference to the related drawings. Alternative embodiments of the invention can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments of the invention whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments of the invention or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

One or more embodiments provide a notification based on determining that a driver has deviated from a determined driving behavior. The conventional approaches for monitoring the driver's actions typically monitored aspects such as, for example, the driver's driving speed, the driver's braking actions, the driver's head movements, and/or the eye movements of the driver. These monitored aspects of the driver can be recorded and displayed.

The conventional approaches are generally limited to determining whether the driver has violated any applicable laws. For example, the conventional approaches generally determine whether the driver has exceeded a speed limit, whether the driver has applied the brake too hard, whether the user is driving at a speed that is far below the speed limit, whether the driver is making unsafe lane changes, and/or whether the driver is tailgating.

However, although the conventional approaches can determine whether the driver has violated any laws, the conventional approaches are unable to protect the driver from dangers which arise from driving practices that are unsafe but that are nevertheless legal. Specifically, a driver can deviate from the driver's typical driving behavior to the driver's detriment. The driver can deviate from the driver's typical driving behavior if the driver is distracted, fatigued, upset, happy, experiencing road rage, and/or enduring an adverse medical condition, for example. When the driver deviates from the driver's typical driving behavior, the driver can possibly cause harm.

In view of the shortcomings of the conventional approaches, one or more embodiments of the invention are directed to a system that: (1) learns a driver's typical driving behavior/pattern, (2) recognizes when the driver is deviating from the driver's typical driving behavior/pattern, and (3) provides a notification regarding the deviation. One or more embodiments of the invention can provide the notification regarding the deviation to the driver and/or to other authorized recipients. Upon receiving the notification, the driver and/or the authorized recipients can thus take preventative measures in order to avoid potential future harm. As such, in contrast to the conventional approaches, one or more embodiments can allow the driver to be aware of the potentially harmful deviation even if the deviation has not violated any laws. Thus, by using one or more embodiments, a driver can possibly avoid/prevent future traffic accidents.

One or more embodiments of the invention are directed to a cognitive system that can learn a driver's behavior. In other words, one or more embodiments learn how the driver reacts to different road/driving conditions. For example, the cognitive system can learn how the driver reacts when the driver encounters heavy/light traffic, when the driver is driving on local/highway roads, when the driver is driving at different times of the day, and/or when the driver encounters various weather conditions.

In order to learn the driver's behavior, the cognitive system of one or more embodiments can use a global positioning system (GPS) to determine the location of the driver's vehicle. Based on the determined vehicle location and the current time, one or more embodiments can then refer to one or more information sources in order to determine the weather conditions and the traffic conditions that are encountered by the driver. In the course of learning the driving behavior, the cognitive system of one or more embodiments can also receive data from a vehicle camera and/or data from one or more vehicle sensors. Sensor data can include data such as speedometer data, blind-spot monitoring data, forward collision sensor data, water sensor data, rain sensor data, barometer data, Doppler radar data, proximity sensor data, position sensor data, Light Detection and Ranging (LIDAR) data, and/or camera data, for example.

FIG. 1 illustrates a cognitive system 110 that provides a notification based on a determined deviation from a determined driving behavior in accordance with one or more embodiments of the invention. Cognitive system 110 can correspond to a hardware-based controller that includes an analyzer unit 112 and a processor 111. Cognitive system 110 can operate in conjunction with a GPS 113, one or more cameras 114, one or more sensors 115, and/or one or more transmitters 116 to transmit the notification. The notification can be generated by a notification generator 132. The notification can be received by a receiver via a notification system 133 of a mobile device 121. The notification can also be provided to the driver via an infotainment system 134 of the vehicle 131.

With one or more embodiments, analyzer unit 112 can be configured to interpret and to record how the driver reacts to the different weather and/or traffic conditions that are encountered at the determined location at the determined time. Weather and traffic conditions may be determined by accessing a traffic information system 117, a weather information system 118, and/or by analysis of the vehicle sensors 115 and cameras 114. The cognitive system 110 of one or more embodiments of the invention can be trained. The system can learn how a specific user drives on the different types of roads and under the different conditions. Cognitive system 110 can be constantly updated over time to adapt to a driver's changing habits (e.g., the way in which a driver drives under certain condition at age 18 may be different than the way that same driver drives when they are 25). The cognitive system 110 may also use sensors 115 and/or cameras 114 to determine if a driver's habits vary if one or more passengers are in the vehicle. In some embodiments, the system may be able to identify passengers (i.e., by using facial recognition on captured camera data) to determine a driver's habits with specific passengers.

Cognitive system 110 can learn that the driver does not exceed the speed limit by more than a threshold number of miles per hour. For example, cognitive system 110 can learn that the driver typically drives three-miles-per-hour under the speed limit, while the driver is driving on a highway, when the traffic is light, and when the weather conditions are normal.

As another example, cognitive system 110 can determine that the driver generally drives 10 miles-per-hour below the speed limit when encountering poor weather conditions (such as, for example, rain or snow). Cognitive system 110 can also determine that the driver rarely or never tailgates other drivers under normal traffic conditions. Specifically, cognitive system 110 can determine a typical following distance for the driver that is based on a current speed (e.g., a driver typically maintains a distance of 50 feet behind other drivers when traveling at 40 mph). Cognitive system 110 can also determine that the driver rarely makes sudden lane changes. As such, one or more embodiments can use sensor data from the driver's vehicle 131 (e.g., data received from a forward warning collision distance sensor, data received from a wheel angle sensor, data relating to a GPS position, etc.) to capture information about the driver's typical driving behavior at each location and under each condition.

After the driver's driving behavior is learned by cognitive system 110, one or more embodiments can be configured to detect the road/driving conditions that are currently encountered by the driver while driving. The current road/driving conditions can be determined based on the data that is received from the previously-described GPS system 113, vehicle camera 114, and/or vehicle sensor 115.

One or more embodiments can then compare the driver's current reaction (to the current road/driving conditions) against the driver's historical behavior under similar road/driving conditions in the past. One or more embodiments can use a driving pattern deviation detector 119. One or more embodiments can operate in conjunction with a database 120 (of data that is accumulated by the cognitive learning system) that contains the parameters that define the driver's historical driving behavior. Database 120 can also store profiles of one or more drivers, the typical driving patterns of the drivers, and information regarding whom to contact in the event of a detected driving deviation. As described in more detail below, one or more embodiments can provide a notification of the driver's deviation to the driver's mobile device 121.

The system of one or more embodiments can recognize specific roads and conditions that the driver had previously encountered in order to compare driver's current driving patterns/behavior against the driver's historical driving behavior. If a driver is currently driving on a road that had not yet been driven upon by the driver in the current conditions, then the cognitive system of one or more embodiments of the invention can search for similar roads and conditions that the user had previously encountered in order to determine how the driver is expected to drive on the road in the given conditions. In view of the above, with one or more embodiments of the invention, the driver's current trip can be monitored and compared against the driving patterns that the cognitive system has learned based on the stored instances of the driver's driving.

The cognitive system of one or more embodiments of the invention can detect whether the driver is deviating from the driver's expected historical/typical driving behavior. Examples of detectable driving deviations can include, but are not limited to, differences in speed, differences in reacting to adverse weather conditions or to other nearby vehicles, differences in following distance, and/or differences in performing lane changes. A detectable difference in speed can be instances where the system determines that the driver is driving faster or slower than the expected/typical driving speed by a threshold amount. A detectable difference in reacting to adverse weather conditions can include instances where the system determines that the driver is not slowing down in adverse weather conditions that the driver would normally slow down under. A detectable difference in following distance can include instances where the system determines that the driver is driving closer than normal to other vehicles for the current traffic conditions. A detectable difference in performing lane changes can include instances where the system determines that the driver is making unsafe lane changes, where the lane change occurs without enough distance between vehicles or where the lane change occurs without any signaling performed by the driver.

With one or more embodiments of the invention, if the cognitive system detects that the driver deviates from the expected historical/typical driving behavior by a predetermined threshold, the system can transmit a notification to the driver and/or to authorized recipients. With regard to the authorized recipients, one or more embodiments can inform friends, family, and/or law enforcement that the driver has deviated from the driver's typical driving behavior.

In one embodiment of the invention, the system can transmit the notification to the driver by transmitting the notification via the vehicle speakers of the vehicle, via a heads-up display on the vehicle windshield, through a vehicle-infotainment system, to the user's mobile device, etc. Once the driver receives the notification, the driver can become aware that the driver is driving in an atypical manner. As such, if the driver is driving in an atypical manner as a result of being distracted, being lost in thought, and/or experiencing road rage, the driver can realize that preventative action is needed.

In one or more embodiments of the invention, the system can transmit the notification to authorized recipients. As described above, authorized recipients can include, for example, friends, family members, and/or loved ones of the driver. The system can provide the notification to these authorized recipients via a transmission to their mobile devices. Upon receiving the transmission via their mobile devices, the authorized recipients can speak to the user at the time of receiving the transmission or at a later time. In one example, an authorized recipient can call the driver through a Bluetooth speaker that is within the vehicle of the driver.

Upon receiving communication from an authorized recipient, the driver can become aware that the driver needs to alter the driver's current driving behavior. If a driver alters the current atypical driving pattern in response to receiving the notification, then the atypical driving pattern can be omitted from being incorporated into the driver's expected driving behavior. As such, the atypical driving behavior is not incorporated into the driver's historical driving behavior.

If the driver does not alter the current atypical driving pattern in response to receiving the notification, the driver can continuously receive additional notifications. In another embodiment of the invention, the cognitive system can notify law enforcement if the current driving pattern is determined to be illegal. With one or more embodiments of the invention, if the driver does not alter the current atypical driving behavior, the cognitive system can control one or more vehicle systems to modify the operation of the vehicle in order to conform to the driver's historical driving behavior. For example, if the driver is currently driving at a faster speed compared to the historical driving behavior, one or more embodiments can modify operation of the vehicle by reducing the vehicle speed. If the driver is following another vehicle at a closer following distance compared to the historical driving behavior, one or more embodiments can modify operations of the vehicle by increasing the following distance, for example.

Figure 2:
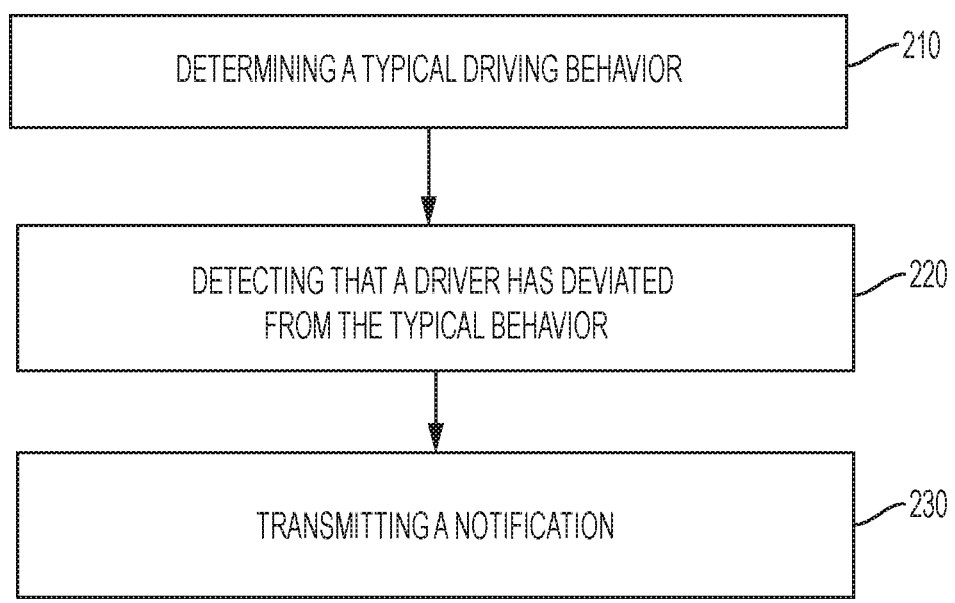
FIG. 2 depicts a flowchart of a method in accordance with one or more embodiments of the invention.

FIG. 2 depicts a flowchart of a method in accordance with one or more embodiments of the invention. The method of FIG. 2 can be performed by a controller of a vehicle system that is configured to provide a notification based on a deviation from a determined driving behavior. With one or more embodiments, the method of FIG. 2 can be performed by or in conjunction with a vehicle electronic control unit (ECU). The method includes, at block 210, determining, by a vehicle controller associated with a vehicle, a typical driving behavior of a driver of the vehicle. The method also includes, at block 220, detecting, by the vehicle controller, that the driver has deviated from the typical driving behavior. The method also includes, at block 230, transmitting a notification that indicates that the driver has deviated from the typical driving behavior.

Figure 3:
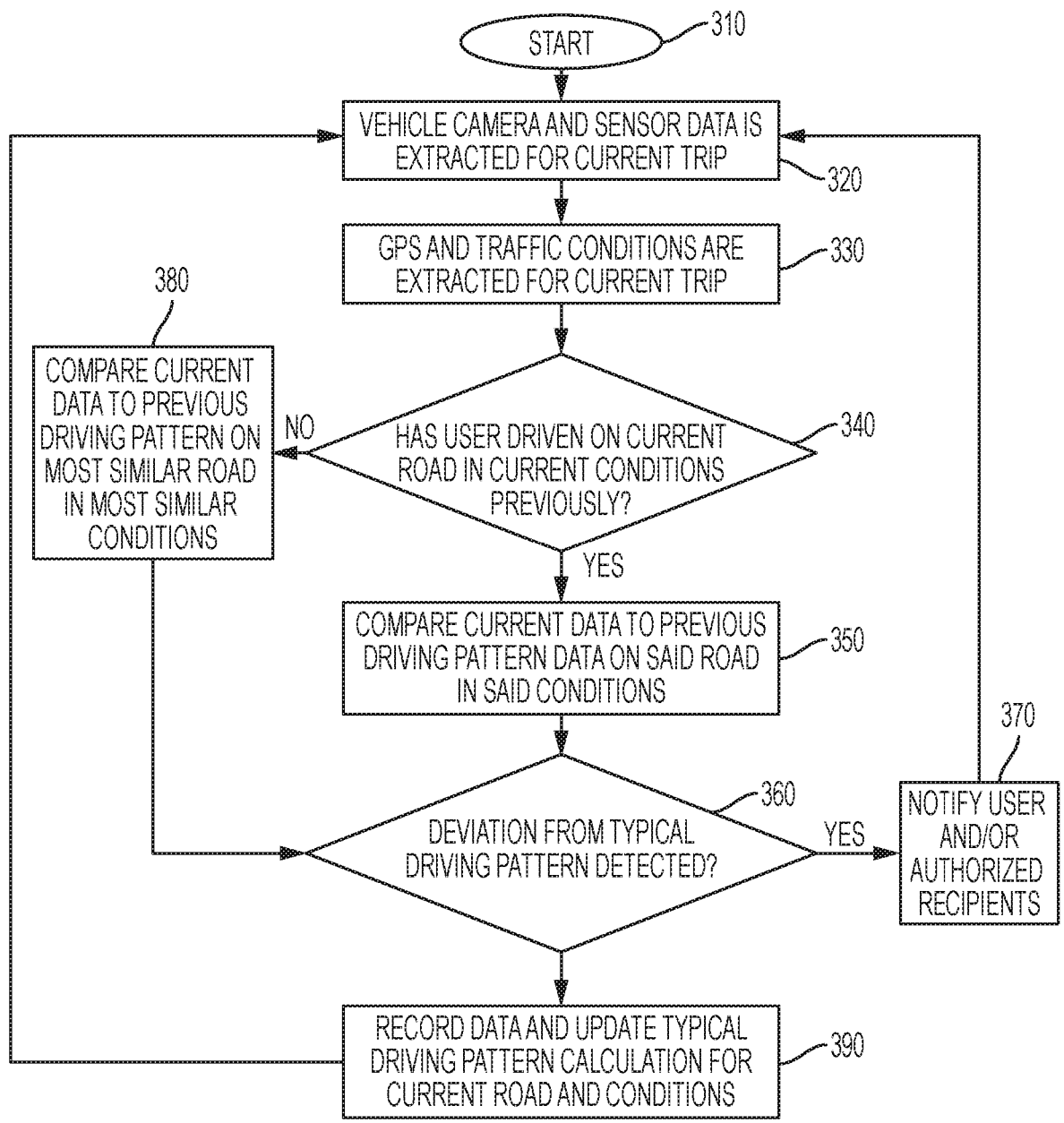
FIG. 3 depicts a flowchart of another method in accordance with one or more embodiments of the invention.

FIG. 3 depicts a flowchart of another method in accordance with one or more embodiments of the invention. The method begins at 310. At 320, one or more embodiments receives/extracts data from the vehicle camera and/or vehicle sensor for a current trip of the vehicle. At 330, one or more embodiments receives/extracts data regarding the GPS location and/or the traffic conditions. The traffic conditions can be determined based on, at least, information from a traffic information system and/or a weather information system, for example. At 340, the cognitive system of one or more embodiments can determine whether the driver has previously driven on the current road under the current conditions. If the driver has previously driven on the current road under the current conditions, then, at 350, one or more embodiments determine an expected driving behavior for the driver based on the historical driving behavior when previously driving on the current road under conditions that are the same as the current conditions. One or more embodiments then compare the expected driving behavior against the how the driver is currently driving. If the driver has not previously driven on the current road under the current conditions, then, at 380, the cognitive system determines an expected driving behavior for the driver based on the driver's historical driving behavior when previously driving on a road similar to the current road, and when driving under conditions similar to the current conditions. At 360, the cognitive system determines whether the driver has deviated from the driver's expected driving behavior. At 370, if the cognitive system determines that a deviation has occurred, then one or more embodiments notifies a user and/or other authorized recipients at 370. At 390, one or more embodiments records the data and updates the parameters that define the driver's typical driving behavior.

Figure 4:
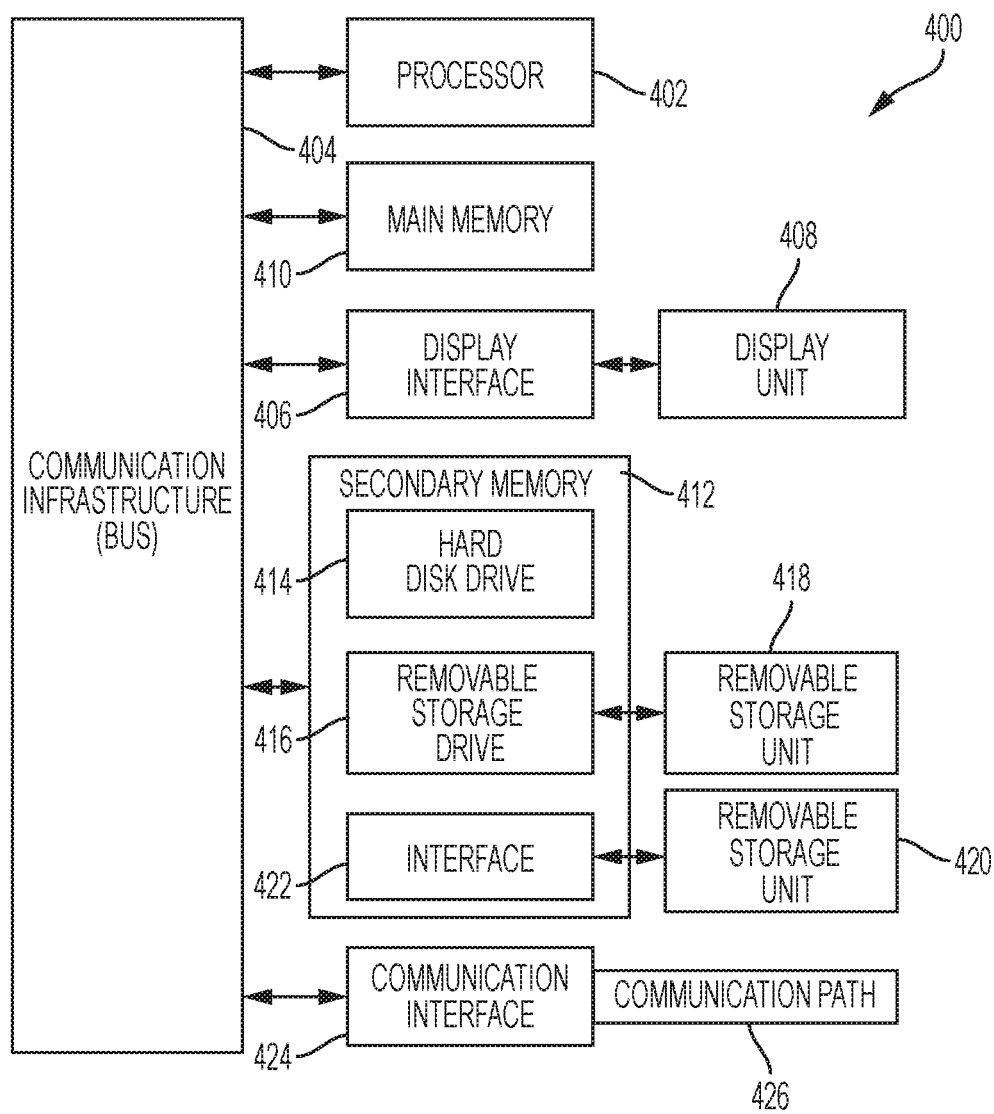
FIG. 4 depicts a high-level block diagram of a computer system, which can be used to implement one or more embodiments of the invention.

FIG. 4 depicts a high-level block diagram of a computer system 400, which can be used to implement one or more embodiments of the invention. Computer system 400 can correspond to or operate in conjunction with, at least, a vehicle monitoring system and/or a vehicle ECU, for example. Computer system 400 can be used to implement hardware components of systems capable of performing methods described herein. Although one exemplary computer system 400 is shown, computer system 400 includes a communication path 426, which connects computer system 400 to additional systems (not depicted) and can include one or more wide area networks (WANs) and/or local area networks (LANs) such as the Internet, intranet(s), and/or wireless communication network(s). Computer system 400 and additional system are in communication via communication path 426, e.g., to communicate data between them.

Computer system 400 includes one or more processors, such as processor 402. Processor 402 is connected to a communication infrastructure 404 (e.g., a communications bus, cross-over bar, or network). Computer system 400 can include a display interface 406 that forwards graphics, textual content, and other data from communication infrastructure 404 (or from a frame buffer not shown) for display on a display unit 408. Computer system 400 also includes a main memory 410, preferably random access memory (RAM), and can also include a secondary memory 412. Secondary memory 412 can include, for example, a hard disk drive 414 and/or a removable storage drive 416, representing, for example, a floppy disk drive, a magnetic tape drive, or an optical disc drive. Hard disk drive 414 can be in the form of a solid state drive (SSD), a traditional magnetic disk drive, or a hybrid of the two. There also can be more than one hard disk drive 414 contained within secondary memory 412. Removable storage drive 416 reads from and/or writes to a removable storage unit 418 in a manner well known to those having ordinary skill in the art. Removable storage unit 418 represents, for example, a floppy disk, a compact disc, a magnetic tape, or an optical disc, etc. which is read by and written to by removable storage drive 416. As will be appreciated, removable storage unit 418 includes a computer-readable medium having stored therein computer software and/or data.

In alternative embodiments of the invention, secondary memory 412 can include other similar means for allowing computer programs or other instructions to be loaded into the computer system. Such means can include, for example, a removable storage unit 420 and an interface 422. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 420 and interfaces 422 which allow software and data to be transferred from the removable storage unit 420 to computer system 400.

Computer system 400 can also include a communications interface 424. Communications interface 424 allows software and data to be transferred between the computer system and external devices. Examples of communications interface 424 can include a modem, a network interface (such as an Ethernet card), a communications port, or a PC card slot and card, a universal serial bus port (USB), and the like. Software and data transferred via communications interface 424 are in the form of signals that can be, for example, electronic, electromagnetic, optical, or other signals capable of being received by communications interface 424. These signals are provided to communications interface 424 via a communication path (i.e., channel) 426. Communication path 426 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 410 and secondary memory 412, removable storage drive 416, and a hard disk installed in hard disk drive 414. Computer programs (also called computer control logic) are stored in main memory 410 and/or secondary memory 412. Computer programs also can be received via communications interface 424. Such computer programs, when run, enable the computer system to perform the features discussed herein. In particular, the computer programs, when run, enable processor 402 to perform the features of the computer system. Accordingly, such computer programs represent controllers of the computer system. Thus it can be seen from the foregoing detailed description that one or more embodiments of the invention provide technical benefits and advantages.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Figure 5:
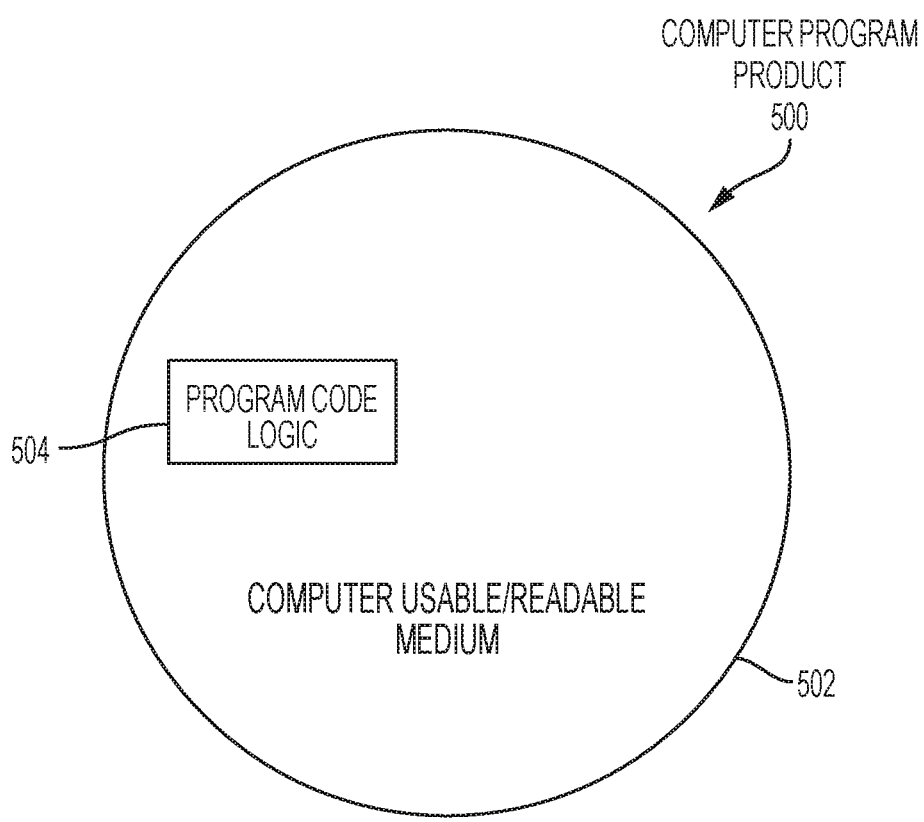
FIG. 5 depicts a computer program product, in accordance with an embodiment of the invention.

FIG. 5 depicts a computer program product 500, in accordance with an embodiment of the invention. Computer program product 500 includes a computer-readable storage medium 502 and program instructions 504.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
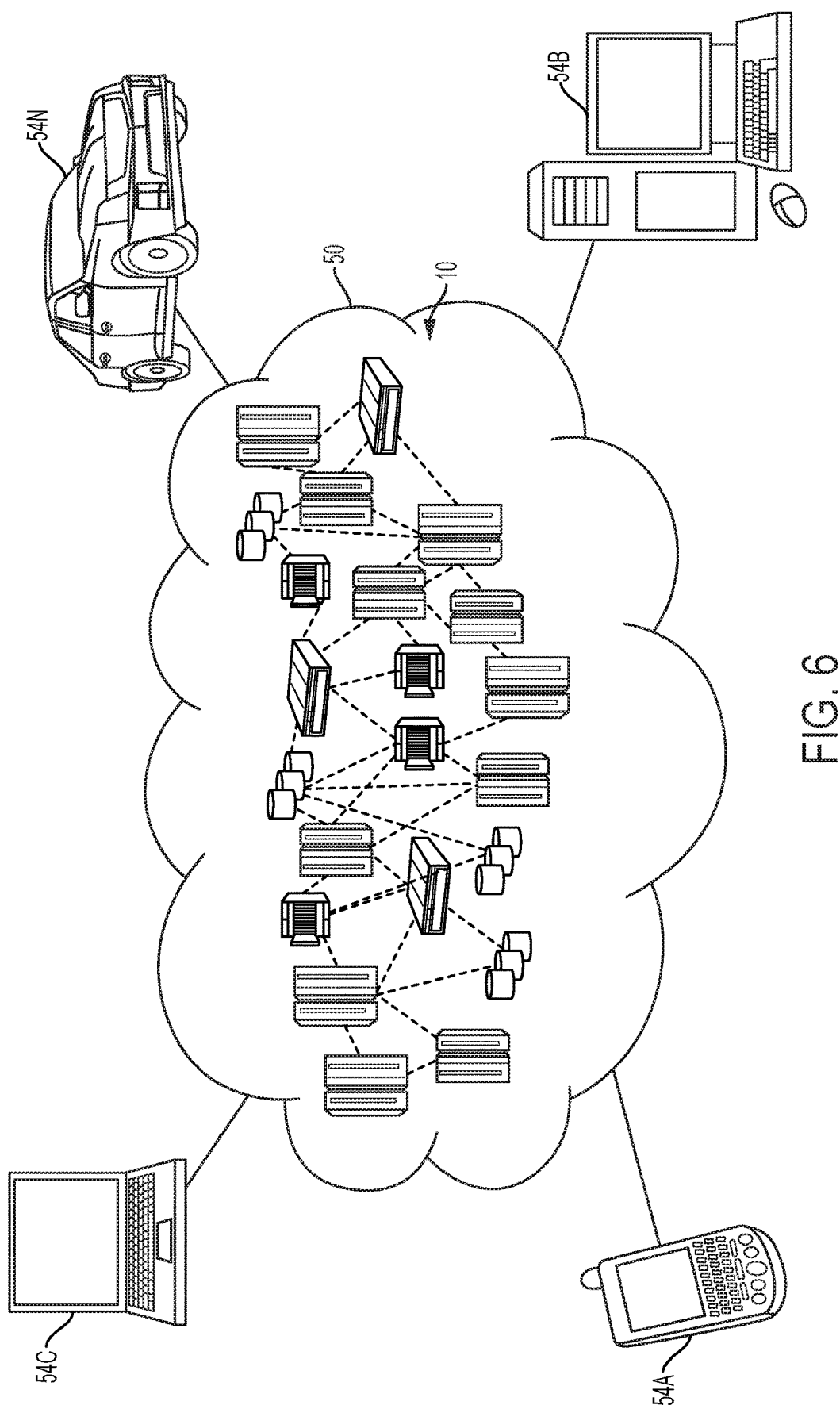
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
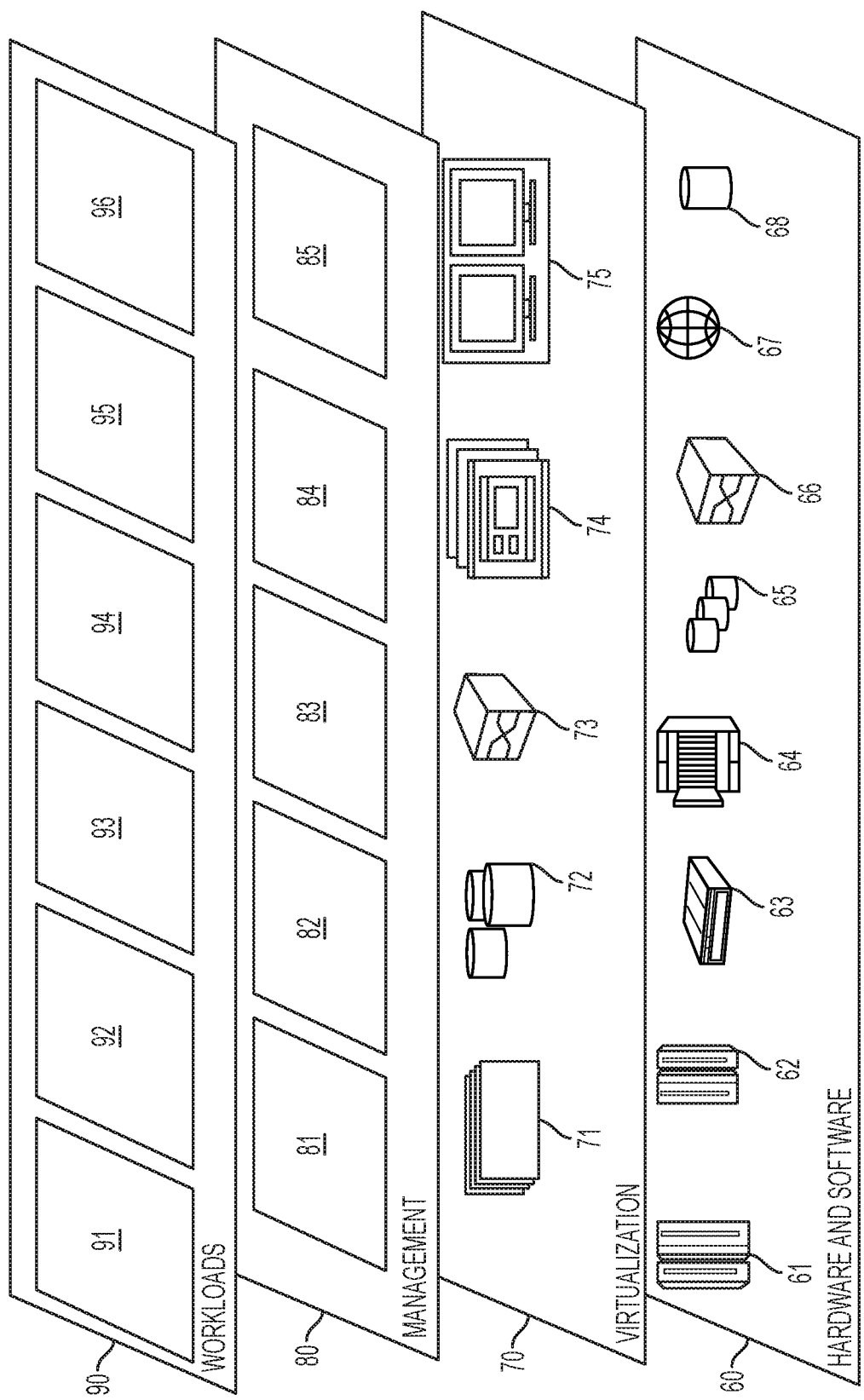
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification provider 96 that provides a notification based on a deviation from a determined driving behavior.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a vehicle controller associated with a vehicle, conditions for a current trip of the vehicle, wherein the conditions include a current road, current traffic conditions and current weather conditions;
   determining, by the vehicle controller associated with the vehicle, a typical driving behavior of a driver of the vehicle, wherein the typical driving behavior of the driver included an expected driving behavior for the driver based on the historical driving behavior when previously driving on the current road under traffic conditions and weather conditions that are the same as traffic conditions and current weather conditions;
   detecting, by the vehicle controller associated with the vehicle, that the driver has deviated from the typical driving behavior;
   transmitting a notification that indicates that the driver has deviated from the typical driving behavior;
   monitoring a driving behavior of the driver after the notification is transmitted; and
   based on a determination that the behavior of the driver has not returned to the typical driving behavior after the notification is transmitted, automatically controlling one or more vehicle systems to modify an operation of the vehicle in order to conform to the driver's typical driving behavior.

2. The computer-implemented method of claim 1, wherein the typical driving behavior is determined based on data received from a vehicle camera, data received from a vehicle sensor, and data received from a global positioning system.

3. The computer-implemented method of claim 2, wherein the vehicle sensor comprises at least one of a blind-spot sensor, a forward-collision sensor, a water sensor, a rain sensor, a barometer, a Doppler radar sensor, and a proximity sensor.

4. The computer-implemented method of claim 1, wherein the detecting that the driver has deviated from the typical driving behavior comprises at least one of detecting that the driver is driving faster than a typical speed by a threshold amount, detecting that the driver is not slowing down in adverse weather conditions, detecting that the driver is driving closer than normal to other vehicles, detecting that the driver is making unsafe lane changes, detecting that the driver is making lane changes without enough distance between vehicles, and detecting that the driver is making lane changes without signaling.

5. The computer-implemented method of claim 1, wherein transmitting the notification comprises transmitting the notification to the driver or to an authorized receiver.

6. The computer-implemented method of claim 1, further comprising determining that the driver has modified driving of the vehicle based on the transmitted notification, and responsively not including the deviation into the typical driving behavior.

7. A computer system of a vehicle comprising:
   a memory; and
   a processor system communicatively coupled to the memory;
   the processor system configured to perform a method comprising:
      determining conditions for a current trip of the vehicle, wherein the conditions include a current road, current traffic conditions and current weather conditions;
      determining a typical driving behavior of a driver of the vehicle, wherein the typical driving behavior of the driver included an expected driving behavior for the driver based on the historical driving behavior when previously driving on the current road under traffic conditions and weather conditions that are the same as traffic conditions and current weather conditions;
      detecting that the driver has deviated from the typical driving behavior;
      transmitting a notification that indicates that the driver has deviated from the typical driving behavior;
      monitoring a driving behavior of the driver after the notification is transmitted; and
      based on a determination that the behavior of the driver has not returned to the typical driving behavior after the notification is transmitted, automatically controlling one or more vehicle systems to modify an operation of the vehicle in order to conform to the driver's typical driving behavior.

8. The computer system of claim 7, wherein the typical driving behavior is determined based on data received from a vehicle camera, data received from a vehicle sensor, and data received from a global positioning system.

9. The computer system of claim 8, wherein the vehicle sensor comprises at least one of a blind-spot sensor, a forward-collision sensor, a water sensor, a rain sensor, a barometer, a Doppler radar sensor, and a proximity sensor.

10. The computer system of claim 7, wherein the detecting that the driver has deviated from the typical driving behavior comprises at least one of detecting that the driver is driving faster than a typical speed by a threshold amount, detecting that the driver is not slowing down in adverse weather conditions, detecting that the driver is driving closer than normal to other vehicles, detecting that the driver is making unsafe lane changes, detecting that the driver is making lane changes without enough distance between vehicles, and detecting that the driver is making lane changes without signaling.

11. The computer system of claim 7, wherein transmitting the notification comprises transmitting the notification to the driver or to an authorized receiver.

12. The computer system of claim 7, wherein the method further comprises determining that the driver has modified driving of the vehicle based on the transmitted notification, and responsively not including the deviation into the typical driving behavior.

13. A computer program product comprising a computer-readable storage medium having program instructions embodied therewith, the program instructions readable by a processor system to cause the processor system to:

determine, by a vehicle controller associated with a vehicle, conditions for a current trip of the vehicle, wherein the conditions include a current road, current traffic conditions and current weather conditions;

determine, by the vehicle controller associated with the vehicle, a typical driving behavior of a driver of the vehicle, wherein the typical driving behavior of the driver included an expected driving behavior for the driver based on the historical driving behavior when previously driving on the current road under traffic conditions and weather conditions that are the same as traffic conditions and current weather conditions;

detect, by the vehicle controller associated with the vehicle, that the driver has deviated from the typical driving behavior;

transmit a notification that indicates that the driver has deviated from the typical driving behavior;

monitoring a driving behavior of the driver after the notification is transmitted; and based on a determination that the behavior of the driver has not returned to the typical driving behavior, automatically controlling one or more vehicle systems to modify an operation of the vehicle in order to conform to the driver's typical driving behavior.

14. The computer program product of claim 13, wherein the typical driving behavior is determined based on data received from a vehicle camera, data received from a vehicle sensor, and data received from a global positioning system.

15. The computer program product of claim 14, wherein the vehicle sensor comprises at least one of a blind-spot sensor, a forward-collision sensor, a water sensor, a rain sensor, a barometer, a Doppler radar sensor, and a proximity sensor.

16. The computer program product of claim 13, wherein the detecting that the driver has deviated from the typical driving behavior comprises at least one of detecting that the driver is driving faster than a typical speed by a threshold amount, detecting that the driver is not slowing down in adverse weather conditions, detecting that the driver is driving closer than normal to other vehicles, detecting that the driver is making unsafe lane changes, detecting that the driver is making lane changes without enough distance between vehicles, and detecting that the driver is making lane changes without signaling.

17. The computer program product of claim 13, wherein transmitting the notification comprises transmitting the notification to the driver or to an authorized receiver.

\* \* \* \* \*